(12) United States Patent
Schachter

(10) Patent No.: US 7,949,724 B1
(45) Date of Patent: May 24, 2011

(54) DETERMINING ATTENTION DATA USING DNS INFORMATION

(75) Inventor: Joshua Schachter, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 178 days.

(21) Appl. No.: 11/966,205

(22) Filed: Dec. 28, 2007

(51) Int. Cl.
*G06F 15/16* (2006.01)
*G06F 15/173* (2006.01)

(52) U.S. Cl. ...................................... 709/217

(58) Field of Classification Search ............... 709/217, 709/223, 224
See application file for complete search history.

(56) References Cited

U.S. PATENT DOCUMENTS

| | | | |
|---|---|---|---|
| 7,689,544 B2 * | 3/2010 | Koenig | 353/25 |
| 2002/0083029 A1 * | 6/2002 | Chun et al. | 706/45 |
| 2004/0073707 A1 * | 4/2004 | Dillon | 709/245 |
| 2007/0255848 A1 * | 11/2007 | Sewall et al. | 709/232 |

* cited by examiner

*Primary Examiner* — Hussein A ElChanti
(74) *Attorney, Agent, or Firm* — Seth H. Ostrow; Ostrow Kaufman

(57) ABSTRACT

Generally, the present invention provides for monitoring user Internet activity based on DNS information. The invention includes accessing a plurality of query logs from a plurality of DNS servers and retrieving a plurality of DNS requests from the query logs. The DNS requests are requests from a various computing devices that have requested web content from web servers indicated by IP addresses. The invention further includes processing the DNS requests to determine Internet-based activity information by the plurality of computing devices that requested the web content and determining attention data based on the activity information. The attention data indicates web search trends based on the corresponding IP addresses accessed by the requesting computing devices.

16 Claims, 2 Drawing Sheets

DETERMINING ATTENTION DATA USING DNS INFORMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to monitoring user-based Internet activity. More specifically, embodiments of the present invention are directed towards systems, methods and computer program products for collecting user data for determining attention data for web activity trends using domain name system ("DNS") based information.

BACKGROUND OF THE INVENTION

Users typically utilize DNS services to resolve name requests for network based assets in accordance with known techniques, which include the user entering a URL and the DNS system translating the URL to a numeric address associated with the URL, thereby allowing for routing of the request and subsequent retrieval of the information that the user is requesting.

Existing computing systems use various techniques to track user Internet activity and this tracked activity can provide many useful options for systems supporting the Internet operations. For example, a common technique to track user activity includes using local software modules or data, such as cookies, resident on a local processing device to monitor the user activity. As described herein, user activity generally refers to the accessing of different web pages and other Internet-based resources.

Another technique for monitoring activity can include monitoring the user's activity where a user logs into a particular Internet system and then navigates within or through this system. One example may be a user logging into a network, such as a corporate server or an internet service provider ("ISP") network. The user activities can be tracked by monitoring the URL associated with a given item of content that the user retrieves, which indicates the locations that a user visits. Other techniques include accessing cache information associated with various browsers, where the cache includes stored information about the users Internet activities.

There are also numerous user-tracking systems available in the marketplace, where such systems are readily employed by web sites and marketing companies to access and monitor Internet traffic. These systems track user activities by recording how often a particular web page is accessed and the time of access, with this tracking information readily usable for determining corresponding metrics associated with content on corresponding web pages.

Existing systems, however, are limited to harnessing the user's computer to collect this information, monitoring the traffic itself or using third-party traffic applications to determine the activity information. There are not currently any traffic collection systems that utilize DNS to collect web request information for use in determining attention data. This information can be very valuable when used by data processing algorithms that analyze the data for particular trends.

These trends, as determined from the activity data, can be used to augment many of the existing business models associated with Internet-activity, including the placement of advertisement, as well as improving relevancy of search results. For example, when an Internet search is conducted, the ordering of the search results can be modified based, in part, on the trend data to place more popular or time-based pertinent information higher in the rankings, thereby improving the relevance of the search results. Similarly, advertising associated with the search results can be improved by providing advertisements consistent with current trends.

SUMMARY OF THE INVENTION

Generally, the present invention includes a method, system and computer readable medium including executable instructions, that provide for monitoring user Internet activity on the basis of DNS information. Embodiments of the invention comprise accessing one or more query logs from one or more DNS servers and retrieving stored DNS requests from the query logs. The DNS requests are requests from various computing devices that have requested web content from a web server indicated by an IP addresses in the logs. Embodiments of the invention further include processing the DNS requests to determine Internet-based activity information by the one or more computing devices that requested the content and determining attention data on the basis of the activity information. The attention data indicates web search trends on the basis of corresponding IP addresses accessed by the requesting computing devices.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
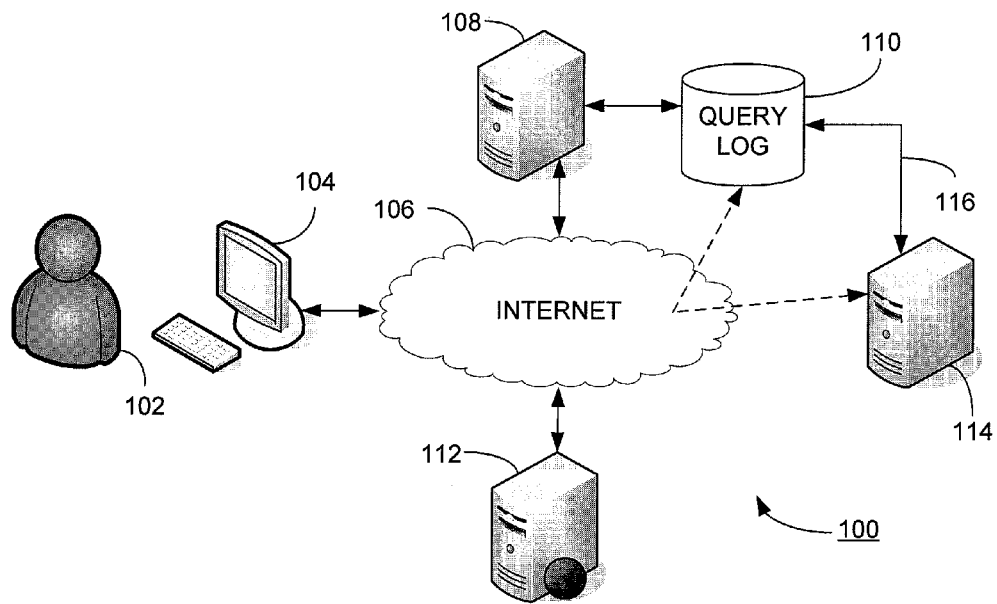
FIG. 1 illustrates a schematic block diagram of a computing environment that includes a system for monitoring user Internet activity on the basis of DNS information according to one embodiment of the present invention.

FIG. 1 illustrates one embodiment of a system 100 that includes a user 102 with a computer 104 connected to the internet 106. The system 100 further includes a DNS server 108 with a query log 110, a web content server 112 and a processing server 114.

The user 102 and computer 104 are illustrated as a single user 102 and a single computer 104, but it is recognized that any number of users 102 having computers 104 can access the Internet 106 in accordance with known access techniques. It is also recognized that any number of DNS servers 108, query logs 110 and web servers 112 may be included in the system, but only one is illustrated herein for clarity purposes only. It is also recognized that various elements and components regarding the operation of interconnectivity and DNS activity regarding the directing of web requests in accordance with known techniques, have been omitted for clarity purposes only. Furthermore, the structure, function and operation of the DNS system are well known to those of skill in the art.

In the system 100, the user 102 enters a URL request on a browser or other type of application on the computing device 104, where this URL request is provided to the DNS server 108 via the Internet 106. The DNS server 108 operates in accordance with known DNS server operations, performing the look-up, translation and redirection operations. The redirection operation redirects the web request to the web server 112, whereby responsive web content is transmitted to the computer 104 via the Internet 106, in accordance with known techniques.

The DNS server 108, upon performing the translation and redirection operations, also logs the DNS request in the query log 110. The query log 110 may be one or more storage devices operative to store the DNS resolution information and the log 110 may be local to the DNS server 108 or, in another embodiment, remote to the DNS server. In one embodiment, the DNS server 108 may be a root server.

In the system 100, the processing server 114 is operative to retrieve the DNS requests 116 stored in the query logs 110. This retrieval may be through a direct connection to the log 110, such as where the processing server 114 and the log 110 are local to each other, across a private or local network or in another embodiment, the access may be via the Internet 106, as illustrated by the dashed line in FIG. 1.

Figure 2:
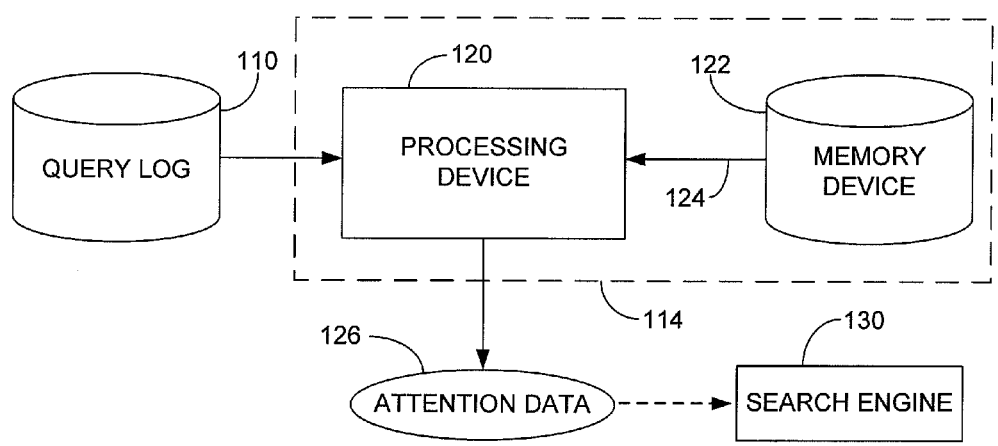
FIG. 2 illustrates a schematic block diagram of a processing device in a processing server that uses the DNS information to determine attention data according to one embodiment of the present invention.

For further clarity, FIG. 2 illustrates a schematic block diagram of the processing server 114 of FIG. 1, which includes a processing device 120 and a memory device 122 having executable instructions 124 stored therein. The processing device 120 may be any suitable type of processing device operative to perform processing operations in response to the executable instructions 124. The memory device 122 may be any suitable type of memory device operative to store the executable instructions 124 thereon such that these instructions can be removed and received by the processing device 120 for the performance of the corresponding operations.

In the embodiment of FIG. 2, as well as illustrated in FIG. 1, the processing server 114 receives the DNS requests 116 from the query logs 110. The DNS requests 116 may be one or more types of data fields that include data indicating which IP addresses have been requested from various computing devices 102. The DNS requests 116 may also include additional information, such as the time at which the DNS request was made and other available information that can be usable by the processing device 120.

According to FIG. 2, the processing device 120 receives the executable instructions 124 from the memory device 122 and is thereby operative to process the DNS requests to determine Internet-based activity information. From this activity information, the processing device 120 thereby generates attention data 126. This attention data 126 indicates web search trends on the basis of the corresponding IP addresses accessed by the requesting computing devices.

For example, one technique may include referencing the various URL information from the DNS requests to a look-up table or other type of resource that provides a reference between the URL information and the underlying content associated with the URL. For example, if the URL information indicates concentrated user activity for a themed website, the theme of this website may be indicative of a particular trend. The collective information extracted from the DNS requests stored in the query logs can be formulated into the attention data that indicates the possible trends, where the trends reflect user traffic activity.

In one embodiment of FIG. 2, attention data 126 may be provided to a search engine 130 for use in improving search result relevancy. The search engine 130 may include additional operations as recognized by one skilled in the art, such as converting the attention data, if needed, or other operations to assimilate new attention data with existing attention data. In one embodiment of the application of attention data to the search engine, the search engine uses the attention data 126 as one of any number of factors for determining relevancy or otherwise prioritizing, sorting or ordering results of a search request.

There are also additional embodiments available for monitoring Internet activity as described herein, including embodiments relating to the collection of the DNS query information. One embodiment includes providing DNS server operations for an ISP. This embodiment allows for the storage of the DNS requests in a local query log. The retrieval of the DNS requests from the local log may then be done via an internal network. Another embodiment may include hosting a DNS server for the ISP, similar to the embodiment above, this allows the local storage of the DNS request information. Similarly, the retrieval of the DNS requests from the local log may then be done via an internal network.

In additional embodiments, or in conjunction with the foregoing embodiments, the DNS query information may also be retrieved or determined from additional sources. For example, the DNS query information, while described above from the query log 110, may also be available via the server 108, the network 106 and the client 112. In the embodiment where the DNS query information is via the server 108 may include monitoring server 108 activities and denoting the DNS query requests for subsequent examination by the processing server 114. In the embodiment where the DNS query information is via network 106 may include watching network traffic for subsequent examination by the processing server 114. In the embodiment where the DNS query information is via the client 112 may include monitoring client 112 activities, such as which URLs are accessed, and denoting the DNS query requests for subsequent examination by the processing server 114.

Figure 3:
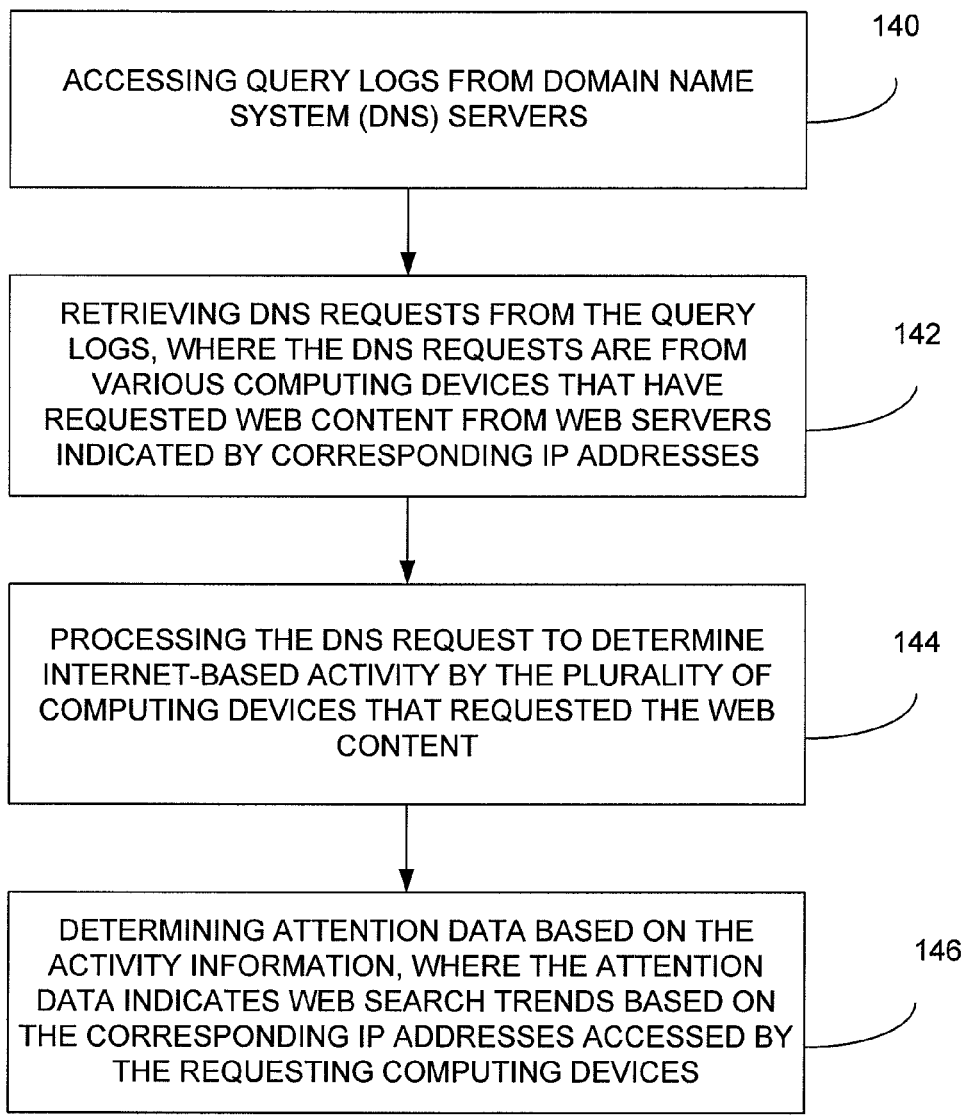
FIG. 3 illustrates a flowchart of the steps of a method for monitoring user activity on the basis of DNS information according to one embodiment of the present information.

FIG. 3 illustrates a flowchart of a method for monitoring user Internet activity according to one embodiment of the present invention. The steps comprising the present method may be performed by the processing device 120 in response to executable instructions 124 from the storage device 122. A first step, step 140, is accessing query logs from one or more DNS servers. With respect to FIG. 1, this may include accessing the query log 110 associated with the DNS server 108. As described above, accessing the query log may be done locally or across a networked connection, e.g., the Internet.

A next step, step 142, is retrieving DNS requests from the query logs. Again with reference to FIG. 1, the DNS requests are from various computing devices, e.g. computing device 104, that have requested web content from web servers 112 indicated by corresponding IP addresses. As described above, the DNS server 108 translates and redirected the URL-based request to an IP address request and records this, along with other related information, as a DNS request in the query log 110.

As described above relative to FIG. 2, additional embodiments may include retrieving of the DNS request from additional sources. For example, the DNS request data may be from the network server, the network (Internet) and the client.

Another step, step 144, is processing the DNS request to determine Internet-based activity by the one or more computing devices that requested web content. As described above, the processing includes reviewing the DNS requests and thereby recognizing the various accessed web sites or other Internet-based resources. This may include, for example, using look-up tables or other types of resources to translate the DNS request information into processable information, such as a table indicating particular URLs or IP addresses that relate to particular types of content.

At step 146, attention data is determined on the basis of the activity information, where the attention data indicates web search trends based on the corresponding IP addresses accessed by the requesting computing devices. As described above, this attention data 126 may then be used for various purposes with different processing systems including, but not limited to, a search engine that includes or otherwise utilizes the attention data in operations for generating search results.

Another embodiment, as described above, may include the steps of providing DNS server operations for an Internet Service Provider ("ISP") and storing the DNS requests in a local query log associated with the at least one hosted DNS server. Another embodiment, as described above, may include the steps of hosting at least one DNS server for an ISP and storing the DNS requests in a local query log associated with the at least one hosted DNS server. Another embodiment, as described above, may include the additional steps of providing the attention data to a search engine processing device and updating search engine results operations using the attention data.

Thereby, the attention data may be determined from DNS request information stored in the query log(s). Previous techniques required either processing overhead on the user's computer or processing operations running on top of the existing web infrastructure to track this information. Herein, the attention data can be discerned from the query logs storing the DNS request information that naturally occurs in typical Internet-based activity.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms memory and/or storage device may be used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for monitoring user Internet activity based on domain name system ("DNS") information, the method comprising:
   accessing one or more query logs from one or more DNS servers of an internet service provider, the one or more query logs including one or more DNS requests;
   retrieving the one or more DNS requests from the query logs, where a given DNS requests is from a computing device requesting web content from a web server indicated by an internet protocol ("IP") address;

translating the DNS requests into processable information comprising a table maintained by the internet service provider indicating a type of content associated with a corresponding IP address;

processing the translated DNS requests to determine Internet-based activity information of the computing device that requested the web content on the basis of the type of content associated with the corresponding IP address;

determining attention data based on the activity information, where the attention data indicates web activity trends of the computing device on the basis of the corresponding IP address accessed by the computing device and the type of content associated with the IP address;

providing the attention data from the internet service provider to a search engine processing device;

incorporating the attention data provided by the internet service provider with one or more existing criteria used by the search engine processing device to determine search result relevancy; and updating search engine result operations using the attention data.

2. The method of claim 1, wherein the attention data indicates how many times the IP address is accessed.

3. The method of claim 1, wherein at least one of the one or more DNS servers is a root server.

4. The method of claim 1 comprising:
providing at least one DNS server that provides DNS operations for the internet service provider; and
storing the DNS requests in a local query log associated with the at least one hosted DNS server.

5. The method of claim 1 comprising:
hosting at least one DNS server for the internet service provider; and
storing the DNS requests in a local query log associated with the at least one hosted DNS server.

6. The method of claim 1 further comprising:
retrieving information describing DNS request from at least one of: the DNS server, a network upon which the DNS request is transmitted, and the computing device.

7. Non-transitory computer readable media storing program code that when executed by a computer causes the computer to perform a method for monitoring user Internet activity based on domain name system ("DNS") information, the method comprising:

accessing one or more query logs from one or more DNS servers of an internet service provider, the one or more query logs including one or more DNS requests;

retrieving the one or more DNS requests from the query logs, where a given DNS requests is from a computing device requesting web content from a web server indicated by an internet protocol ("IP") address;

translating the DNS requests into processable information comprising a table maintained by the internet service provider indicating a type of content associated with a corresponding IP address;

processing the translated DNS requests to determine Internet-based activity information of the computing device that requested the web content on the basis of the type of content associated with the corresponding IP address;

determining attention data based on the activity information, where the attention data indicates web activity trends of the computing device on the basis of the corresponding IP address accessed by the computing device and the type of content associated with the IP address;

providing the attention data from the internet service provider to a search engine processing device;

incorporating the attention data provided by the internet service provider with one or more existing criteria used by the search engine processing device to determine search result relevancy; and updating search engine result operations using the attention data.

8. The computer readable medium of claim 7, wherein the attention data indicates how many times the IP address is accessed.

9. The computer readable medium of claim 7 comprises:
providing at least one DNS server that provides DNS operations for the internet service provider; and
storing the DNS requests in a local query log associated with the at least one hosted DNS server.

10. The computer readable medium of claim 7 further comprising:
hosting at least one DNS server for the internet service provider; and
storing the DNS requests in a local query log associated with the at least one hosted DNS server.

11. The computer readable medium of claim 7 further comprising:
retrieving information describing DNS request from at least one of: the DNS server, a network upon which the DNS request is transmitted, and the computing device.

12. An apparatus for monitoring user Internet activity based on domain name system ("DNS") information, the apparatus comprising:
a memory device having executable instructions stored therein; and
a processing device, in response to the executable instructions, operative to:
  access one or more query logs from one or more DNS servers of an internet service provider, the one or more query logs including one or more DNS requests;
  retrieve the one or more DNS requests from the query logs, where a given DNS request is from a computing device requesting web content from a web server indicated by an internet protocol (IP) address;
  translate the DNS requests into processable information comprising a table maintained by the internet service provider indicating a type of content associated with a corresponding IP address;
  process the translated DNS requests to determine Internet-based activity information of the computing device that requested the web content on the basis of the type of content associated with the corresponding IP address;
  determine attention data on the basis of the activity information, where the attention data indicates web activity trends of the computing device based on the corresponding IP address accessed by the requesting computing device and the type of content associated with the IP address;
  provide the attention data from the internet service provider to a search engine processing device;
  incorporate the attention data provided by the internet service provider with one or more existing criteria used by the search engine processing device to determine search result relevancy; and
  update search engine result operations using the attention data.

13. The apparatus of claim 12, wherein attention data indicates how many times the IP address is accessed.

14. The apparatus of claim 12, the processing device in response to executable instructions is operative to:

provide at least one DNS server operations for the internet service provider; and store the DNS requests in a local query log associated with the at least one hosted DNS server.

15. The apparatus of claim 12, the processing device in response to executable instructions is operative to:

host at least one DNS server for the internet service provider; and store the DNS requests in a local query log associated with the at least one hosted DNS server.

16. The apparatus of claim 12, the processing device in respond to executable instruction is operative to:

retrieve information describing DNS request from at least one of: the DNS server, a network upon which the DNS request is transmitted, and the computing device.

* * * * *